UNITED STATES PATENT OFFICE.

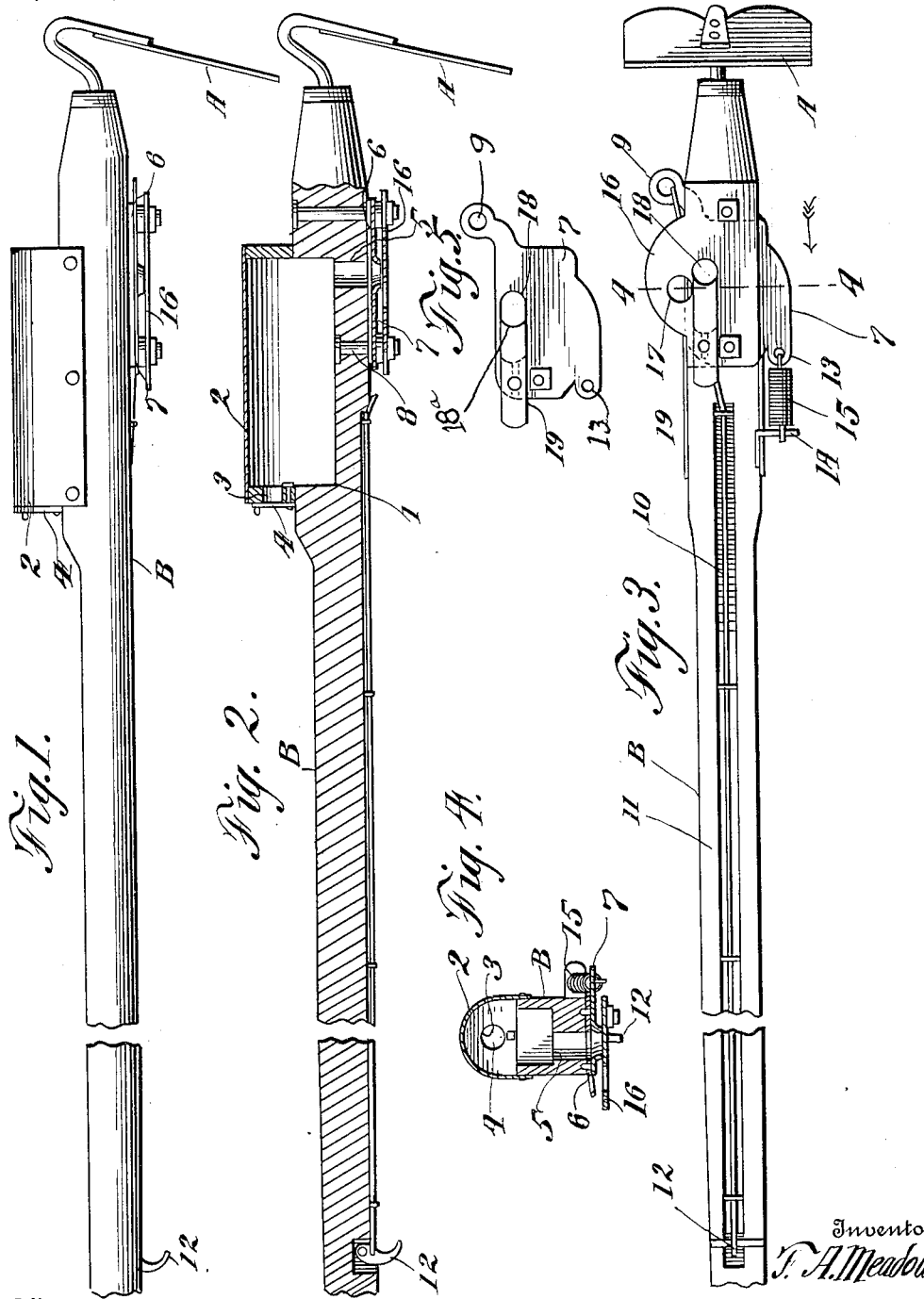

FLOYD A. MEADOWS, OF PEARISBURG, VIRGINIA, ASSIGNOR OF ONE-HALF TO FIELDON A. BONDS, OF PEARISBURG, VIRGINIA.

SEED-DROPPING ATTACHMENT FOR HOE-HANDLES.

1,085,218.  Specification of Letters Patent.  Patented Jan. 27, 1914.

Application filed May 9, 1912. Serial No. 696,202.

*To all whom it may concern:*

Be it known that I, FLOYD A. MEADOWS, a citizen of the United States, residing at Pearisburg, in the county of Giles and State of Virginia, have invented certain new and useful Improvements in Seed-Dropping Attachments for Hoe-Handles, of which the following is a specification.

My invention relates to devices for dropping seed and consists of a device of the character described mounted on an ordinary garden hoe handle to enable the farmer or gardener to replant seed where he finds the growth of plants thin and to always have the seed ready for replanting and held in convenient position for dropping.

My invention has for its object the provision of the combination with a hoe handle, of a seed receptacle mounted thereon and a dropping mechanism operatively secured to the hoe handle and coöperating with the seed receptacle to drop seed, the seed dropping mechanism being operated by means of a suitable hand operated device mounted on the handle of the hoe.

My invention will be described in detail hereinafter and illustrated in the accompanying drawings, in which, Figure 1 is a side view of the hoe handle showing my improved dropping mechanism mounted thereon; Fig. 2, a longitudinal sectional view of the hoe handle and dropping mechanism; Fig. 3, a bottom plan view of the hoe handle and dropping mechanism; Fig. 4, a cross section on the line 4—4 of Fig. 3; and Fig. 5, a detail view of the dropping plate.

In the drawings, similar reference characters will be used to designate corresponding parts throughout the several views.

A indicates a hoe having the handle B secured thereto. The handle B is formed with a recess 1 adjacent to the hoe head A and having a casing 2 secured thereto for holding any kind of garden seed.

3 indicates an opening through which the seed is supplied to the casing 2 and covered by means of a suitably pivoted cover 4 as indicated.

5 indicates the dropper opening communicating with the interior of the casing 2.

6 indicates a wear plate secured to the handle and formed with an opening that alines with the opening 5.

The dropper plate is indicated at 7 and pivotally mounted on a rod or bolt 8 and is provided with an ear 9 to which is secured a suitable flexible element 10 extended through a groove 11 in the under side of the handle B and has its free end secured to a trigger 12 pivotally mounted on said handle B.

13 indicates an ear on the plate 7, 14 a bracket secured to the side of the handle B, and 15 a coiled spring secured to said bracket 14 and the ear 13 and normally tending to hold the plate 7 in the position shown in Fig. 3.

16 indicates a plate fixedly secured under the handle B and the plate 7 and provided with an opening 17 that does not register with the opening 5 in the handle B.

The plate 7 is provided with an elongated opening 18 having downwardly extending walls 18$^a$ engaging and spacing the plate 16 and a plate 19 is slidably mounted on said plate 7 and adapted to increase or decrease the size of the opening 18 as desired to limit the number of seed to be dropped by my improved mechanism.

In use, it will be apparent that when the device is in the position shown in Figs. 2 and 3 that seed contained in the casing 2 and the feed opening 5 will drop into the opening 18 and rest upon the plate 16. Whenever the gardener finds that the plants that he is working on are thin in any places and desires to replant, it will be apparent that he has but to operate the trigger latch 12 and by so doing will swing the plate 7 so that the opening 18 therein will register with the opening 17 in the plate 16 and drop the seed through said opening 17 into the ground. When pressure on the trigger 12 is released, the spring 15 will return the plate 7 to its original position and other seed contained in the dropper opening 15 will enter the opening 18 preparatory to being dropped when desired.

By providing the plate 19, the size of the opening 18 may be regulated as desired by the operator to provide for different sizes of garden seed as well as the number of seed to be planted at any one time.

Having thus described my invention, what I claim is:—

1. In a device of the character described, the combination with a tool handle having an enlarged head provided with a longitudinal recess upon one side thereof and said recess being rectangular in cross section and having an opening adjacent one end thereof extending through said handle to the opposite side thereof, of a semi-cylindrical casing surrounding said recess and secured to the side walls thereof, and plates having openings therein communicating with said recess through said opening in said recess.

2. In a device of the character described, the combination with a tool handle, of a seed receptacle formed therein, a plate secured to said handle and spaced therefrom beneath said seed receptacle, an off-set portion formed intermediate the ends of said plate centrally and upon one side thereof and having an opening formed therein, the second plate pivotally secured between said first plate and said handle and having a longitudinal opening reduced at one terminal formed therein upon one side thereof, means for holding said opening in said second plate normally out of registration with the opening in said first plate, a longitudinal plate slidably mounted upon said second plate adjacent the longitudinal opening therein, means for slidably securing said longitudinal plate to said pivoted plate engaging the reduced portion of the longitudinal opening in said pivoted plate, and means for moving said pivoted plate to allow the opening therein to register with the opening in said first plate including a flexible element secured to said handle.

In testimony whereof I affix my signature in presence of two witnesses.

FLOYD A. MEADOWS.

Witnesses:
 A. H. WOODGARD,
 C. W. BROYLES.

Copies of this patent may be obtained for five cents each, by addressing the "Commissioner of Patents, Washington, D. C."